United States Patent [19]
Kaltenbach

[11] 3,715,946
[45] Feb. 13, 1973

[54] FEED CONTROL APPARATUS FOR A ROTARY TOOL

[76] Inventor: Dieter Kaltenbach, Rebweg 33, 7850 Lorrach, Germany

[22] Filed: Sept. 15, 1971

[21] Appl. No.: 180,654

[30] Foreign Application Priority Data

Sept. 17, 1970 Germany...................P 20 45 930.7

[52] U.S. Cl. .................83/72, 83/470, 83/490, 83/522, 83/554, 408/11
[51] Int. Cl. ...............................................B26d 5/12
[58] Field of Search........83/72, 74, 75, 62, 470, 490, 83/522, 554; 408/10, 11

[56] References Cited

UNITED STATES PATENTS

| | | |
|---|---|---|
| 1,368,369 | 2/1921 | Sykes.........................................83/72 |
| 2,649,646 | 8/1953 | Remmen....................................83/72 |
| 2,989,674 | 6/1961 | Hawkins et al. ....................83/72 UX |
| 3,545,310 | 12/1970 | Porath et al............................408/11 |

Primary Examiner—Frank T. Yost
Attorney—Michael S. Striker

[57] ABSTRACT

A saw blade is rotated by an electric motor while fed by a hydraulic feeding motor into a workpiece. A regulating throttle controls the hydraulic motor to vary the feeding speed, and is operated by a control means to either slowly increase the feeding speed or to rapidly reduce speed in accordance with the indications of a torque responsive amperemeter in the circuit of the electric motor. Two manually settable stops limit the movement of the regulating throttle independently of the control means and of the indication of the amperemeter in two end positions in which the hydraulic feeding motor is set to a maximum and a minimum feeding speed, respectively, selected for a specific workpiece.

10 Claims, 7 Drawing Figures

FEED CONTROL APPARATUS FOR A ROTARY TOOL

BACKGROUND OF THE INVENTION

The present invention is concerned with an apparatus for regulating the feeding speed of a rotary tool, particularly a circular saw blade. In machines of this type, and assuming a particular cutting speed, the maximum feeding speed is depending on two factors, namely firstly the depth of the cut possible for a particular workpiece and tool, and secondly the filling capacity of the notches between the teeth of the sawblade. For example, if the length of the cut material engaged by the sawteeth is short when working a comparatively thin material, the feeding speed can be increased until the maximum permissible depth of cut and maximum thickness of the cut chip are obtained, while for an increased length of the cut in the material, the limited filling volume of the notches between the teeth is of greater importance, and finally necessitates a reduction of the thickness of the chip by reducing the feeding speed.

In known sawing machines, a certain adaptation to these circumstances takes place automatically due to the fact that the hydraulic feeding motor of the sawblade has a chamber of constant pressure for advancing the sawblade, while the other chamber, which is gradually emptied while the sawblade is being fed, is connected by a manual throttle to a return and discharge conduit, so that at an increased engagement length of the sawteeth, the cutting resistance increases, and between the two sides of the feeding piston of the hydraulic feeding motor, an increasing pressure differential is built up due to the fact that the pressure medium can flow out faster through the throttle than the feeding piston can follow. When then the engaged length of the tooth is reduced, an increase of the feeding speed, and a corresponding increase of the thickness of the cut chip takes place. This automatic regulation is not very sensitive, and rather slow, and does not permit a real adaptation of the machine to the maximum possible feeding speed at any moment of the sawing operation.

SUMMARY OF THE INVENTION

It is one object of the invention to provide a method for feeding a rotary tool in such a manner that the above-explained disadvantages are eliminated.

Another object of the invention is to control the feeding of a tool, such as a saw blade, in such a manner that the sawblade operates at any time with the maximum possible feeding speed, even if the cut cross-sections considerably vary as the saw blade is fed into the material.

In order to obtain a reduction of the feeding speed when the load torque is great, and an increase of the feeding speed when the load torque is small, the load torque is sensed, for example by an amperemeter in the circuit of an electric motor driving the saw blade, and a regulating member cooperates with first and second stops which are manually set to maximum and minimum feeding speeds desired in accordance with the cut cross-section of the workpiece.

When the maximum permissible load torque is exceeded, the regulating member moves rapidly into engagement with the stop for the minimum feeding speed, and then slowly moves toward the stop for the maximum feeding speed.

The amperemeter sensing the torque acting on the drive motor is preferably provided with maximum and minimum limit mark members which limit the movement of the indicating pointer which controls, preferably through an electric circuit, the electromagnetic control means of the regulating throttle. In sawing machines, which are designed for several cutting speeds, it is advantageous to automatically change the maximum limit of the sensing indicating pointer when the cutting speed is changed, while the torque is maintained constant, which may be effected by exchanging the transformer of the load responsive sensing amperemeter. When several transformers are suitably constructed and arranged, a switching of the cutting speed obtains automatically and simultaneously the conditions of the torque sensing amperemeter required for the operation of the apparatus.

The invention makes use of the fact that the torque of the drive motor is proportional to the load acting on the sawblade, and the feeding speed of the sawblade is regulated in such a manner, that the maximum permissible load for the respective workpiece is not exceeded whereby damage to the saw blade is prevented. On the other hand, the apparatus of the invention assures that most of the cutting is carried out in the range of the maximum permissible load, and also with the maximum possible feeding speed, so that the machine operates at optimal efficiency.

The amperemeter which senses the load torque acting on the drive motor, may be connected by a pulse generator to the control means of the regulating throttle. However, it is preferred to use a relay circuit for this purpose.

One embodiment of the invention comprises an electric drive motor for rotating a saw blade; feeding means preferably including a hydraulic piston and cylinder motor for feeding the saw blade into a material; regulating means, preferably including an adjustable throttle connected with the hydraulic cylinder and piston motor, and including a movable regulating member; control means including another hydraulic motor, and a reversible electromagnetically controlled valve, connected with the regulating throttle and having a normal position for operating the regulating throttle to slowly increase the feeding speed, and a control position, in which the valve is reversed, for operating the regulating throttle to rapidly reduce the feeding speed; torque responsive sensing means, preferably an amperemeter, for sensing the load torque acting on the electric drive motor, and connected, preferably by a relay circuit, with the electromagnetic means by which the reversing valve is operated for setting the same to the control position when sensing a maximum load torque so that the regulating throttle rapidly reduces the feeding speed and thereby the load torque until the sensing amperemeter sets, at a minimum load torque, the control means back to the normal position; and first and second manually settable stops for limiting the movement of the regulating member independently of the control means and sensing means in two positions in which the regulating throttle sets the feeding means to a maximal feeding speed and to a minimal feeding speed, respectively, selected for a specific workpiece by setting the stops. As a result, the regulating member moves rapidly toward the second stop for obtaining minimum feeding speed and slowly toward the first stop for obtaining maximum feeding speed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 5a is a schematic view illustrating the sawblade in successive positions during cutting of a workpiece;

FIG. 5 is a diagram illustrating the variation of the feeding speed during the successive cutting of portions of the workpiece as shown in FIG. 5a.

DESCRIPTION OF THE PREFERRED EMBODIMENTS

Figure 1:
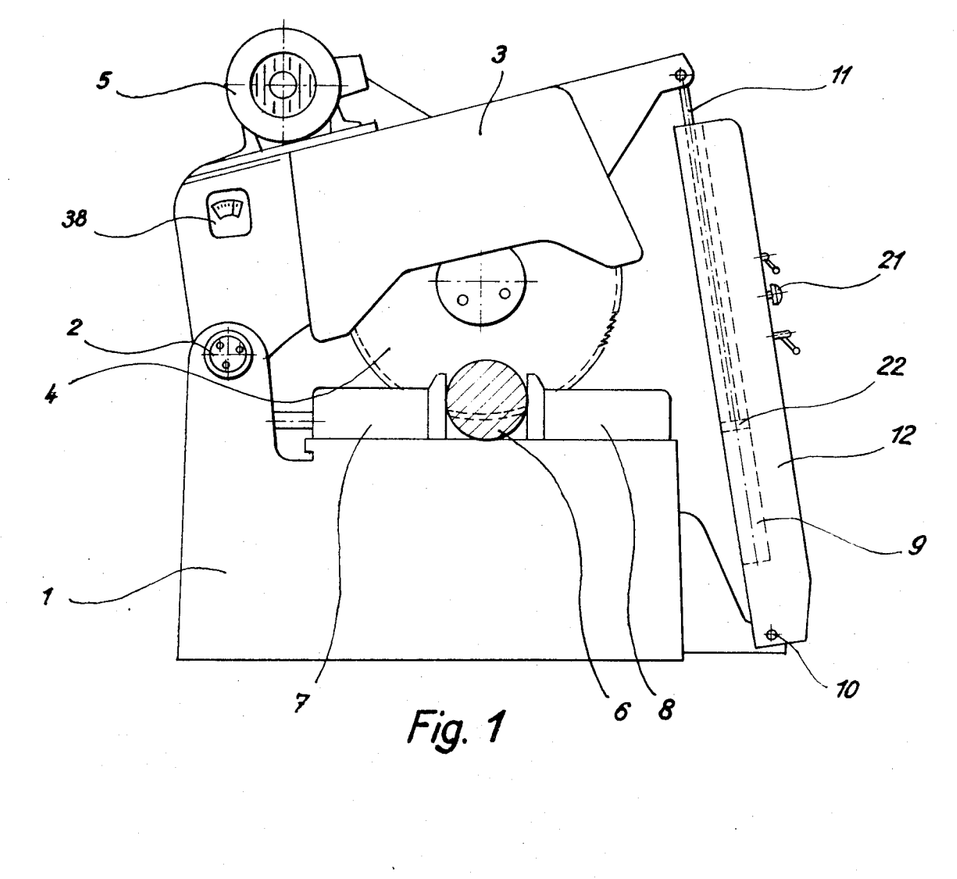
FIG. 1 is a side view illustrating a rotary sawing machine in a somewhat simplified manner.

Referring first to FIG. 1, a cold saw has a supporting base 1 provided with a hinge 2 which an arm 3 is mounted for angular movement. A rotary saw blade 4 is mounted on the arm, and is driven by a motor 5. A workpiece 6 is held by a clamping means 7 and 8 on the supporting base 1. An amperemeter 38 is mounted on arm 3 and connected into the circuit of the electric motor 5 to indicate the current flowing through motor 5, which is proportionate to the load torque exerted by the saw blade 4 on motor 5 during cutting of the workpiece 6.

The tilting of arm 3 with sawblade 4 to move the same relative to the workpiece 6, is effected by a cylinder and piston hydraulic motor arranged in a housing part 12 which is turnable about a shaft 10 and includes a feeding cylinder 9 in which a feeding piston 22 is mounted whose position rod 11 is pivotally connected with the arm 3. Housing part 12 may also cover control means and regulating means for the feeding piston 22, which will be explained with reference to FIG. 2.

Figure 2:
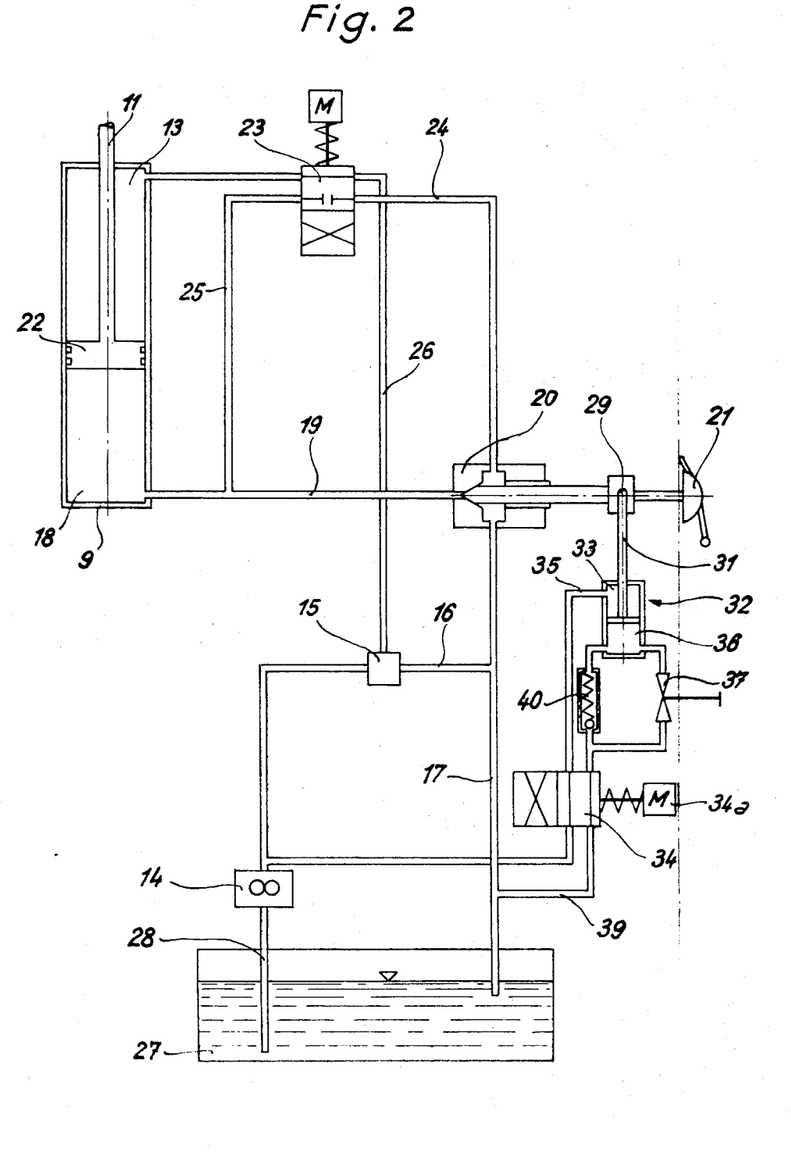
FIG. 2 is a schematic and diagrammatic view illustrating an embodiment of the invention for controlling the sawing machine shown in FIG. 1.

Feeding cylinder 9 and feeding piston 22 are also shown in FIG. 2, and it will be seen that piston 22 forms chambers 13 and 18 in cylinder 9. A pump 14 pumps an operating liquid from a reservoir 27 through a suction conduit 28 into a pressure conduit 26 in which a pressure limiting valve 15 is provided. When the permissible pressure set by limit valve 15 is exceeded, pressure liquid is discharged through return conduits 16, 17 into reservoir 27, so that the pressure in conduit 16 is lower than the pressure in conduit 26. A return conduit 19 connects chamber 18 with regulating throttle 20 which discharges through return conduit 17. The reversing valve 23 has two positions, and has a normal position, shown in FIG. 2 for connecting chamber 13 with pressure conduit 26, and a reversed position connecting chamber 18 through a conduit 25 with regulating throttle 20 and return conduit 17. An electromagnetic means M controls reversing valve 23.

The combined effect of the pressure in cylinder chamber 13 and of the cutting resistance exerted on the sawblade 4, moves feeding piston 22 to reduce the volume of chamber 18 so that pressure fluid flows through conduit 19 and regulating throttle 20 into the return conduit 17. The regulating member 21, which is connected with regulating throttle 20, determines the speed of movement of piston 22 and thereby the feeding speed of sawblade 4.

When a sawing operation has been completed, the feeding piston 22 can be moved in the opposite direction for lifting the sawblade 4 out of the workpiece 6, by reversing the magnetically operated valve 23 so that the chamber 13 is connected by conduit 24 to the return conduit 17, while chamber 18 is connected by conduit 25 to the pressure conduit 26 of pump 14.

The regulating member 21 by which regulating throttle 20 is adjusted, is connected by an adjustable slip clutch 29 with control means operated under control of the amperemeter 28 which constitutes a torque responsive sensing means sensing the load torque acting on the drive motor 5.

The control means include a hydraulic control motor 32 including a control cylinder and a control piston connected by a piston rod 31 and lever 30 (FIG. 3) with the slip clutch 20. A reversing control valve 34 is operated by electromagnetic means 34a under the control of amperemeter 28, which will explained with reference to FIG. 6. A conduit 35 passes through control valve 34 into the chamber 33 of the cylinder and piston means 32, while a conduit 39, connected with the return conduit 17, passes through control valve 34 and into the other control chamber 36 through a check valve 40 and an adjustable throttle 37.

In the position of the control means 32, 40, 37, 34 shown in FIG. 2, pressure medium in conduit 35 operates piston and piston rod 31 to turn regulating member 21 in one direction at a slow speed due to the fact that check valve 40 is closed, and throttle 37 restricts the flow out of control chamber 36. When reversing control valve 34 is shifted to a control position, the flow is reversed, and pressure fluid is supplied through check valve 40 into chamber 36, while fluid in chamber 33 is discharged through conduit 35 and conduit 39 into the reservoir 2, and since no throttle is provided in this path of flow, the adjustment of the regulating throttle 21 to a wider open condition, and thereby an increase of the feeding speed of the sawblade 4 is obtained quickly.

The electromagnetic means 34a of the control valve 34 is controlled by torque responsive sensing means, schematically shown in FIG. 2 to be the amperemeter 38 of the electric drive motor 5, see also FIG. 1.

The amperemeter 38 may operate a pulse generator, not shown, for the electromagnetically controlled valve 34. The sensing means 38 is set to the maximal load of the sawblade 4, and to the corresponding load of motor 5 in such a manner that the control valve 34 is shifted from the illustrated normal position by the pulse generator, not shown, to the control position when the set maximum load of drive motor 5 is exceeded, and sensed by sensing means 38. Consequently, at a selected maximum load and load torque, the hydraulic motor 32 rapidly operates the regulating member 21 to reduce the cross section of the regulating throttle 20, so that the feeding speed of the saw blade 4 is reduced. Due to the reduction of the feeding speed of saw blade 4, the load torque of motor 5 is immediately reduced, so that control valve 34 is shifted under the control of the load torque responsive means 38 and the pulse generator, not shown, to the initial position so that regulating member 21 is operated by the hydraulic control piston cylinder means 32 to adjust the regulating throttle to a higher feeding speed, the adjustment being slow due to the effect of throttle 37.

Figure 3:
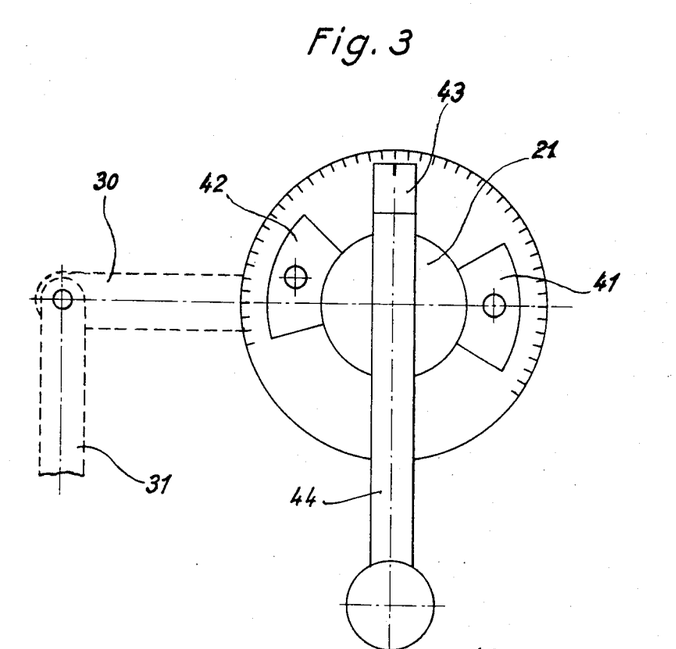
FIG. 3 is a front view and FIG. 4 is a side view illustrating a device for manually setting stops for limiting the movement of the speed regulating means of the machine.
Figure 4:
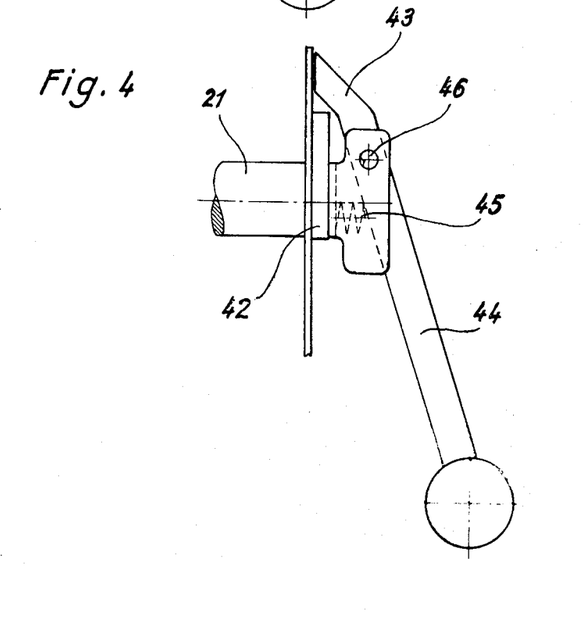

As shown in FIGS. 3 and 4, two manually settable stops 41 and 42 are provided which limit the range of adjustment of regulating member 21, and thereby of the regulating throttle 20 to predetermined maximum and minimum feeding speeds. Regulating member 21 has a projecting nose 43 which cooperates in the illustrated normal position of the handle 44 with the settable stops 41 and 42. When regulating member 21 is turned to a position abutting stop 41 or to a position abutting stop 42 by the control piston and cylinder means 32, the piston and piston rod 31 may continue its movement due to the provision of a slip clutch 29 between the piston rod 31 and its connecting link 30 and the regulating member 21.

The use of the stops 41 and 42 has the advantage that the regulating member 21 can be automatically moved only between two position, associated with maximum and minimum feeding speed of the saw blade 4, while farther movements of regulating member 21 and unnecessary adjustment times are eliminated.

In certain cases it may be advantageous to set the regulating member 21 manually by handle 44 to angular positions beyond the limits provided by stops 41 and 42. Handle 44 is then pressed down against the action of the spring 45 so that nose 43 is raised to a position passing over the set stops 41 and 42. In the normal position of FIG. 4, nose 43 moves along a circular path in which the stops 41 and 42 are located.

The above-described embodiment of the invention is particularly suitable when the sawing machine is provided with a hydraulic feeding means for the sawblade, so that pressure fluid is available. For sawing machines in which the feeding movement of the sawblade is not obtained by a hydraulic motor, it may be advantageous to connect the torque responsive sensing means 38 with the regulating member 21 by an electric stepping motor, not shown.

Figure 6:
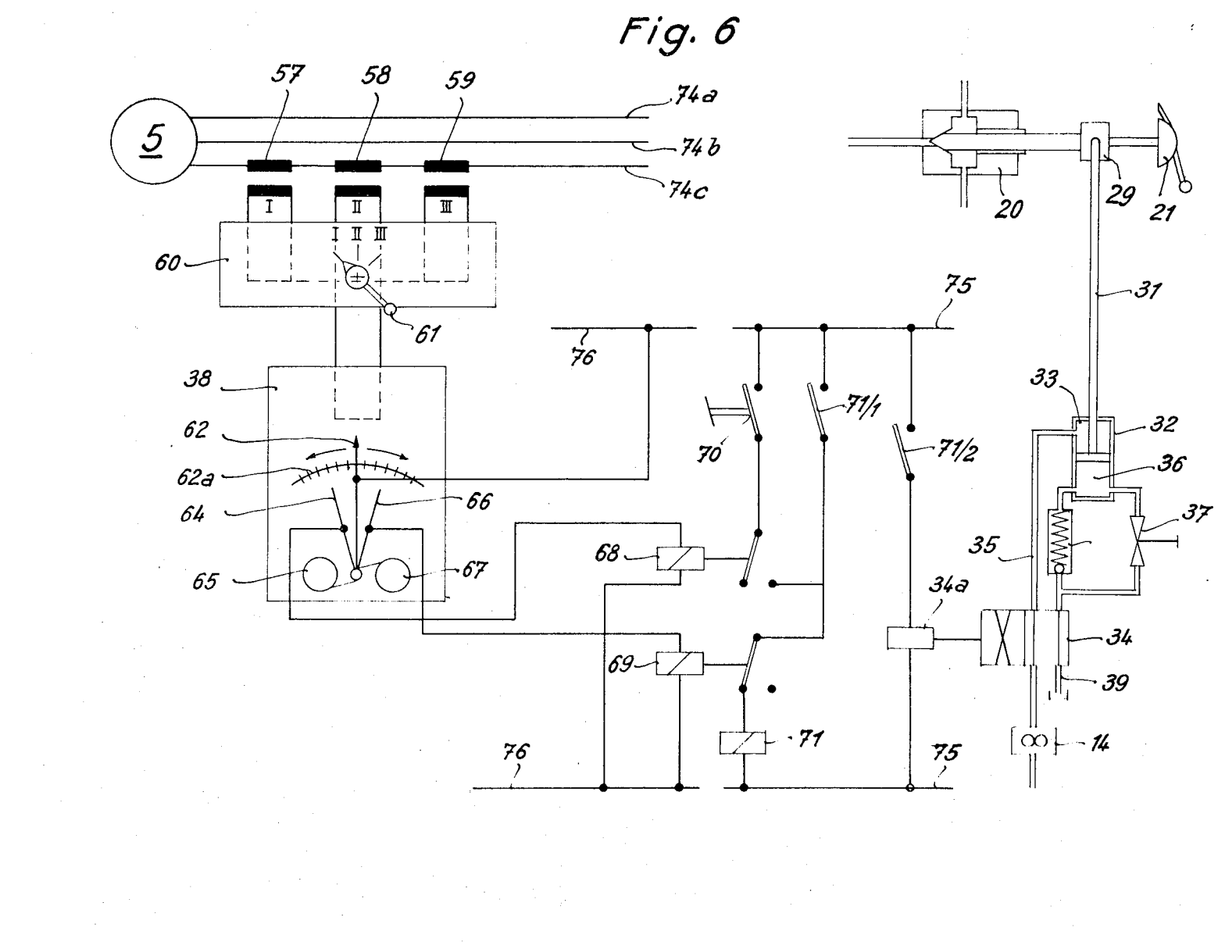
FIG. 6 is a schematic and diagrammatic view showing particularly the electric circuit for operating electromagnetic means for varying the feeding speed depending on the indications of a load responsive amperemeter in the circuit of the electric drive motor.

FIG. 6 illustrates a preferred electric circuit for connecting the torque responsive amperemeter 38 with the electromagnetic operating means 34a of the reversing control valve 34.

The electric drive motor 5 is a three-phase motor connected to three lines 74a, 74b, 74c. In the line 74c, three different transformers 57, 58 and 59 are connected, each of which has two windings so that each winding induces a corresponding current in the other winding. The three transformers 37, 38, and 39 are selected for setting three different rotary speeds of motor 5, and three different cutting speeds of the sawblade 4. The three different cutting speeds are diagrammatically indicated at I, II and III in FIG. 6.

A switching means 60 is connected with the transformers 57, 58, 59, and with the amperemeter 38, so that the latter can be connected by operation of the manual member 61 to anyone of the three transformers 57, 58, 59. The change of the rotary speed of the sawblade 4 can be effected electrically or by means of a motor. In a sawing machine of this type which has several cutting speeds, it is possible to obtain automatically, upon shifting to another cutting speed, a variation of the respective value sensed by sensing means 38 at the same torque, which is accomplished by selecting one of the transformers 37, 38, 39 for connection with the sensing amperemeter 38.

As shown in FIG. 6, the amperemeter 38 has a movable indicator pointer 62 which indicates the load acting on motor 5. By the three transformers 57, 58, 59, the currents occurring at three different speeds and indicated by amperemeter 38, are varied in such a manner that the indicating pointer 62 indicates the torque of the sawblade directly at a corresponding graduated scale 62d.

A maximum limit marking member 66 can set by means of a hand wheel 67 on amperemeter 38. When the indicator member 62 reaches this limit marking member 66, the relay 69 is actuated so that the relay 71 is energized and closes contact 71/2 so that electromagnetic means 34a operates the reversing control valve 34 so that the pressure liquid can flow through the check valve 40 into cylinder chamber 36, and effect fast closing of the regulating throttle 20. In this manner, the feeding speed of the saw blade is quickly reduced so that indicator pointer 62 is moved to indicate the corresponding reduced load of motor 5.

When the other limit marking member 64, set by the handwheel 65, is reached by the indicator pointer 38, relay 68 is actuated, so that its contact energizes relay 71 again whereby the electromagnetic means 34a of the reversing control valve 34 is shifted. This has the effect that the control means 32, 34 slowly open the regulating throttle 20 so that the feeding speed of the saw blade is slowly increased until indicator pointer 62 reaches the maximum limit marking member 66 again.

It should be noted that the manually operated switch 70 can be operated to eliminate the above-described automatic regulation of the feeding speed by amperemeter 38, if operational conditions make this advisable. The contacts 71/1 and 71/2 of relay 71 are actually located within the housing of the relay 71.

While the indicator pointer 62 may be mechanically cooperate with limit marking members 66 and 64, it is possible to obtain the required electrical control signals by an inductive connection between the limit marking members 64 and 66 and the indicator pointer 62. For example, members 64 and 66 may be provided with windings producing a magnetic field which is disturbed by indicator pointer 66 when moving into close proximity with members 64 or 66, which may be U-shaped to increase the force of the respective magnetic field. Instead of mechanical contact between indicator pointer 62 and the limit marking members 64 and 66, a light barrier and photocells may be used.

In the circuit illustrated in FIG. 6 a circuit part to which indicator pointer 62 and limit marking members 64, 66 are connected, has conductor bars connected with a suitable source of electric voltage. Other connector bars, 75 are connected with another voltage source having a different voltage, and supply the current for the operation of the electromagnetic means 34a of the reversing control valve 34.

It will be understood that the electric circuit illustrated in FIG. 6 is schematically indicated by dash and dot lines and amperemeter 38 in FIG. 2. FIGS. 2 and 6 together constitute a preferred embodiment of the invention.

The above-described apparatus has the effect that the regulating means 21, 20 are operated by the control means 32, 34 to effect a slow increase of the feeding speed, as long as the maximum permissible load torque has not been reached at the drive motor 5. When this condition is sensed by the amperemeter 38, control piston means 31 presses the operating liquid out of control chamber 36 and through throttle 37, so that it is possible to adjust the speed of this movement by adjusting throttle 37. When a feeding speed is reached at which the saw blade 4 produces the maximum permissible load, the control means 32, 34 are shifted so that control piston 31 moves rapidly while reducing the volume of pressure chamber 33 through the free return conduit 35, in which no throttle is provided. As a result, the load on the saw blade 4 is reduced, which causes a shifting of control valve 34 and again a gradual increase of the feeding speed of the saw blade.

The apparatus of the invention is very sensitive, so that control piston 31 performs only very small movements substantially in the range of the maximum feeding speed.

The regulating member 21 can be provided with a graduated scale, shown in FIG. 3, for indicating the feeding speed of the sawing blade.

Irrespective of the function of the torque responsive amperemeter 38, the manually settable stops 41 and 42 limit the feeding speed which can vary only between a maximum feeding speed and a minimum feeding speed, determined by manually setting the stops 41 and 42. By the provision of a minimum feeding speed stop, the feeding speed cannot be rapidly reduced to a lower value than is necessary.

Figures 5, 5A:
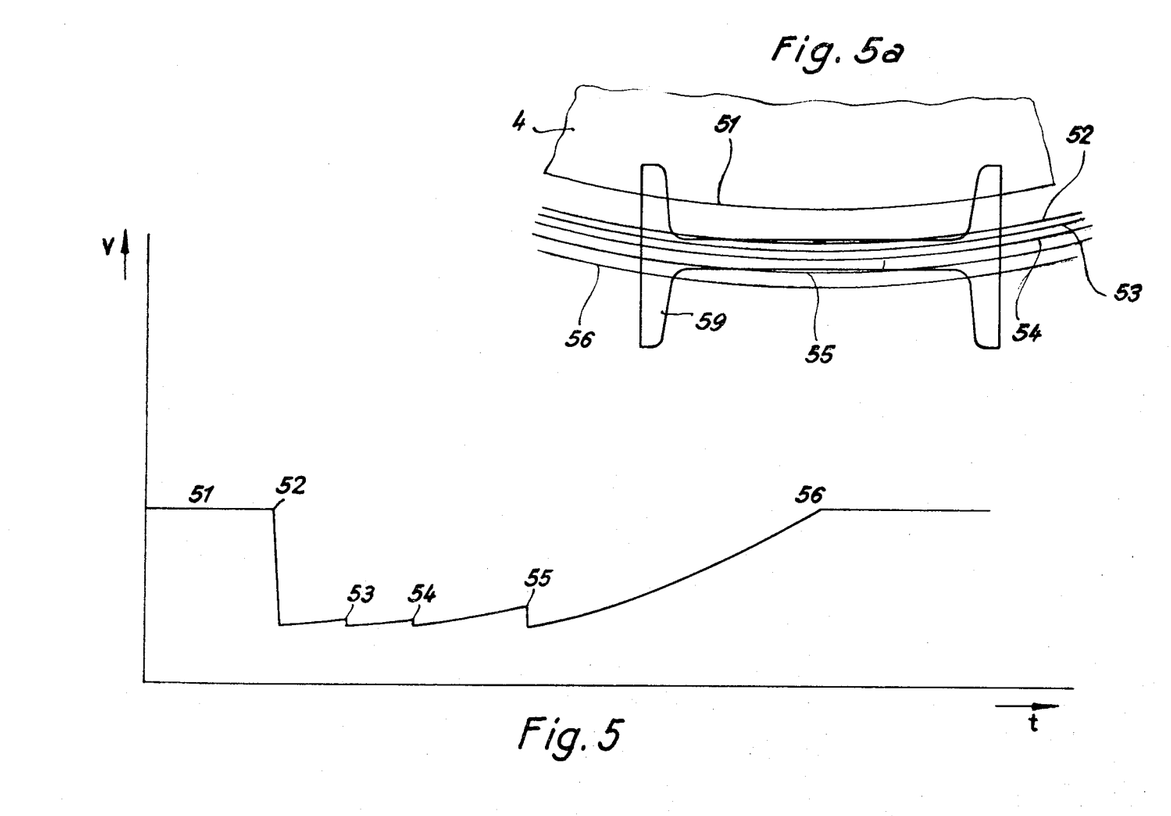

FIGS. 5a and 5 show diagrammatically an operation of the saw blade under the control of the apparatus of the invention. In FIG. 5a, the sawblade 4 is shown in several positions 51 to 56 assumed while being fed by feeding means 22, 11. A I-profile is being cut. As shown in FIG. 5a, in the position 51 of saw blade 4, the length of the cut surface engaged by the teeth of the saw blade is very small, so that it is possible to operate at a maximum feeding speed and with a maximum depth of cut and thickness of the chips. In the position 52, the sawblade engages the web of the bar 59 so that the load torque acting on the sawblade drive is rapidly increased until the set maximum value is reached. In the manner described with reference to FIG. 2, the feeding speed is rapidly reduced and then slowly rises as indicated at 53 in FIG. 5 until the set maximum speed is obtained, which causes again a reduction of the feeding speed.

The same adjustments are obtained when the sawing blade 4 is in the position 54, while in the position 55 in which the sawblade teeth move out of the web of bar 59, see FIG. 5a, a higher feeding speed is possible which is then once reduced. In the meantime, the sawblade arrives in the position 56, so that the feeding speed can rise to the maximum speed at which the operation was started in the position 51 of the sawblade 4.

It will be understood that each of the elements described above, or two or more together, may also find a useful application in other types of feed control apparatus for rotary tools differing from the types described above.

While the invention has been illustrated and described as embodied in a feeding speed control apparatus for a rotary saw blade having manually settable means for limiting the feeding speed between a maximum and a minimum desired for a workpiece, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Feed control apparatus for a rotary tool, comprising a motor means for rotating the tool; feeding means for feeding the tool into a material; regulating means connected with said feeding means for controlling the feeding speed of said tool and including a movable regulating member; control means connected with said regulating means and having a normal position for operating said regulating means to slowly increase the feeding speed, and a control position for operating said regulating means to rapidly reduce the feeding speed; torque responsive sensing means for sensing the load torque acting on said motor means and connected with said control means for setting the same to said control position when sensing a maximum load torque so that said regulating means rapidly reduces the feeding speed and thereby said load torque until said sensing means sets at a minimum load torque said control means back to said normal position; and first and second manually settable stops for limiting movement of said regulating member independently of said control means and sensing means in two positions in which said regulating means sets said feeding means to a maximum feeding speed and to a minimum feeding speed, respectively, selected for a specific workpiece by setting said stops, so that said regulating member moves rapidly toward said second stop for obtaining minimum feeding speed and slowly toward said first stop for obtaining maximum feeding speed.

2. Feed control apparatus as claimed in claim 1 wherein said control means include a movable control member operated under the control of said torque responsive sensing means; and means including a slip clutch connecting said control member with said regulating member so that said control member can continue to move under the control of said sensing means when said regulating member abuts one of said settable stops.

3. Feed control apparatus as claimed in claim 1 wherein said control means include a control cylinder and a control piston forming in said control cylinder first and second control chambers, pump means including a pressure conduit and a return conduit, a reversing control valve having a normal position for connecting said pressure conduit with said first control chamber and said return conduit with said second control chamber and a control position reversing the flow, a throttle connecting said second control chamber with said reversing control valve, a check valve connecting said reversing valve with said second control chamber, operating means controlled by said torque responsive means for shifting said reversing control valve to said control position when sensing a maximum load torque acting on said motor means; and means connecting said control piston with said regulating member.

4. Feed control apparatus as claimed in claim 1 comprising manually operated means connected to said regulating member for operating said regulating means to set said feeding means to different feeding speeds.

5. Feed control apparatus as claimed in claim 4 wherein said manually operated means has a normal position moving along a path limited by said settable stops, and a displaced position moving along a different path passing over said settable stops for controlling said regulating means and feeding means to obtain feeding speeds exceeding said maximum and minimum feeding speeds.

6. Feed control apparatus as claimed in claim 1 wherein said feeding means includes a feeding cylinder and a feeding piston forming feeding chambers in said feeding cylinder, said feeding piston being connected with said tool, pump means including a pressure conduit and a return conduit, and reversing valve means for connecting said conduits with said feeding chambers, respectively; and wherein said regulating means includes adjustable throttle means operated by said control means and being located in said return conduit for reducing flow out of said feeding cylinder during feeding movement of the tool.

7. Feed control apparatus as claimed in claim 1 wherein said torque responsive sensing means includes at least one limit mark member settable to a selected maximum load torque, a movable member cooperating with said limit member and being responsive to the load torque, and means for connecting said movable member with said control means so that the feeding speed is rapidly reduced when said movable member reaches said limit mark member.

8. Feed control apparatus as claimed in claim 7 wherein said torque responsive sensing means include a second limit mark member settable to a selected minimum load torque so that the feeding speed is slowly increased by said control means when said movable member reaches said second limit mark member.

9. Feed control apparatus as claimed in claim 8 wherein said motor means includes an electric motor; and wherein said torque responsive sensing means includes an amperemeter having said movable member as an indicator; wherein said operating means include electromagnetic means; and circuit means connecting said limit mark members and said indicator with said electromagnetic means.

10. Feed control apparatus as claimed in claim 1 wherein said control means include a control cylinder and a control piston forming in said control cylinder first and second control chambers, pump means including a pressure conduit and a return conduit, a reversing control valve having a normal position for connecting said pressure conduit with said first control chamber and said return conduit with said second control chamber and a control position reversing the flow, a throttle connecting said second control chamber with said reversing control valve, a check valve connecting said reversing valve with said second control chamber, operating means controlled by said torque responsive means for shifting said reversing control valve to said control position when sensing a maximum load torque acting on said motor means; and means connecting said control piston with said regulating member; wherein said feeding means includes a feeding cylinder and a feeding piston forming feeding chambers in said feeding cylinder, said feeding piston being connected with said tool, pump means including a pressure conduit and a return conduit, and reversing valve means for connecting said conduits with said feeding chambers, respectively; wherein said regulating means includes adjustable throttle means operated by said control means and being located in said return conduit for reducing flow out of said feeding cylinder during feeding movement of the tool; wherein said motor means includes an electric motor; wherein said torque responsive sensing means includes an amperemeter having said movable member as an indicator; wherein said operating means include electromagnetic means; and circuit means connecting said limit mark members and said indicator with said electromagnetic means.

* * * * *